(12) United States Patent
Dautartas et al.

(10) Patent No.: US 6,577,783 B2
(45) Date of Patent: Jun. 10, 2003

(54) SELF-ALIGNED FIBER OPTIC CONNECTOR FOR NXM ARRAYS

(75) Inventors: Mindaugas Fernand Dautartas, Alburtis, PA (US); Joseph Michael Freund, Fogelsville, PA (US); Dennis Stefanik, Weisenberg Township, Lehigh County, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 10/179,333

(22) Filed: Jun. 24, 2002

(65) Prior Publication Data

US 2002/0168135 A1 Nov. 14, 2002

Related U.S. Application Data

(62) Division of application No. 09/468,448, filed on Dec. 21, 1999, now Pat. No. 6,442,306.

(51) Int. Cl.[7] ................................................. G02B 6/26
(52) U.S. Cl. .............................. 385/17; 385/15; 385/16; 385/18; 385/31
(58) Field of Search .............................. 385/17, 15, 16, 385/18, 31, 32, 54, 56, 19, 20, 43, 147

(56) References Cited

U.S. PATENT DOCUMENTS 5,920,665 A 7/1999 Presby

*Primary Examiner*—Mohammad Sikder
(74) *Attorney, Agent, or Firm*—Wendy W. Koba

(57) ABSTRACT

A fiber array connector is passively self-aligned to provide optical coupling between a first NxM array of optical fibers and a second NxM array of optical fibers. Each fiber array is inserted in a separate half of the connector, where each individual fiber is then supported through an aperture in a fiber array connector piece part. The connector piece part comprises a stack of substrate members, processed to include apertures for supporting the fibers in an array formation. The top substrate member of each stack is further processed to include alignment apertures so that as the two fiber array connector halves are mated the alignment fiducials on the connector piece parts will mate and self-align the fiber arrays.

10 Claims, 5 Drawing Sheets

NxN SELF-ALIGNED FIBER ARRAY CONNECTOR

US 6,577,783 B2

SELF-ALIGNED FIBER OPTIC CONNECTOR FOR NXM ARRAYS

This application is a DIV of 09/468,448 Dec. 21, 1999 U.S. Pat. No. 6,442,306.

TECHNICAL FIELD

The present invention relates to a connector suitable for joining N×M arrays of optical fibers and, more particularly, to a self-aligned connector structure capable of providing the required coupling efficiency between the fiber arrays.

BACKGROUND OF THE INVENTION

In many newer applications, particularly in the data communication environment, it is becoming increasingly necessary to connect a first array of optical fibers to a (similarly dimensioned) second array. Prior art arrangements for coupling fibers together generally provide for single fiber-to-fiber couplings, where the endfaces of a pair of fibers to joined are housed in a ferrule together, fused together, or spliced together using any other suitable method. Duplex connectors, capable of joining a first pair of fibers to a second pair of fibers are also well-known. However, as larger arrays of fibers are needed to be connected together, these techniques become extremely time-consuming and costly.

An exemplary connector arrangement for providing a self-aligned connection between a pair of fiber arrays is disclosed in U.S. Pat. No. 5,920,665 issued to H. Presby on Jul. 6, 1999. The Presby connector, however, is limited to forming self-aligned connections between one-dimensional arrays.

A need remains in the prior art, therefore, for a fiber array connector that is relatively robust, self-aligned and capable of being modified as fiber array sizes change.

SUMMARY OF THE INVENTION

The need remaining in the prior art is addressed by the present invention, which relates to a connector suitable joining N×M arrays of optical fibers and, more particularly, to a self-aligned connector structure capable of providing the required coupling efficiency between the fiber arrays.

In accordance with the present invention, silicon substrates are used as the fiber support members in the connector, where a first plurality of substrates are used to support a first M×N array of fibers and a second plurality of substrates are used to support a second M×N array of fibers. The substrates are patterned to define the desired location for each fiber in the array, then etched to form through-holes (vias) through the width of the substrate at each fiber location. Each plurality comprises at least of pair of etched substrates, of sufficient depth to capture the endface of each inserted fiber and secure the endface at a predetermined point. The connector is thus formed by mating the first plurality of substrates to the second plurality of substrates.

It is an aspect of the present invention that the substrates from each plurality that physically contact each other during mating include alignment fiducials so that self-alignment between the fiber arrays is achieved. In particular, a set of pyramidal detents may be formed on the mating substrates during the etch process, with a spherical member disposed between associated detents to provide alignment and mechanical attachment between the connector halves.

In another aspect of the invention, the fiber array-holding substrates may be formed to provide for lens elements to be disposed at each fiber endface, if necessary, to provide improved coupling efficiency between the fibers (as an alternative, each fiber endface may be rounded (i.e., lensed) to improve coupling efficiency).

A connector housing for the array connector of the present invention is advantageously configured to hold one half of the array connector in a fixed position and allow the remaining half to "float" in order to allow the fiducials to contact one another and provide the required, accurate alignment between the connector arrays.

Other and further aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
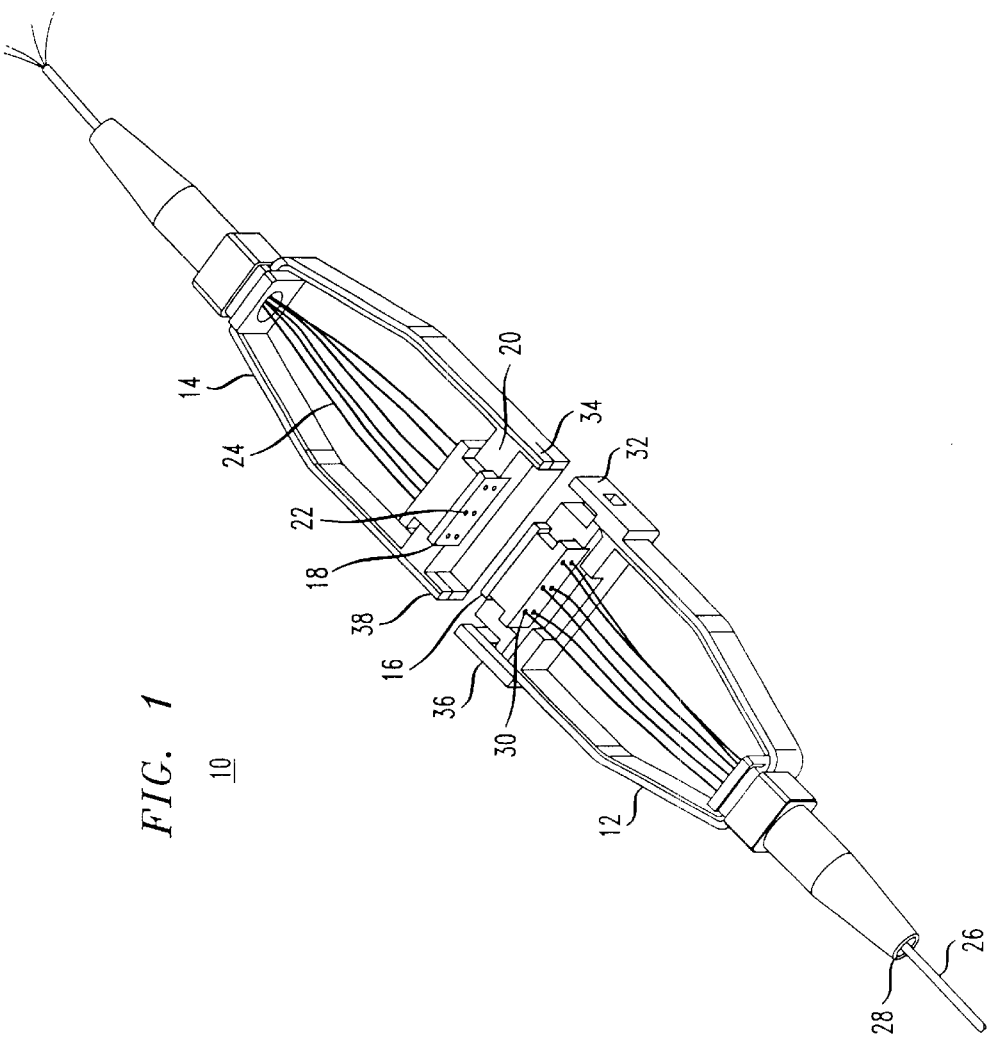
FIG. 1 is an isometric, exploded view of an exemplary fiber array connector and associated housing, formed in accordance with the present invention, the top halves of the connector housing being removed to allow for the internal components to be exposed.
Figure 2:
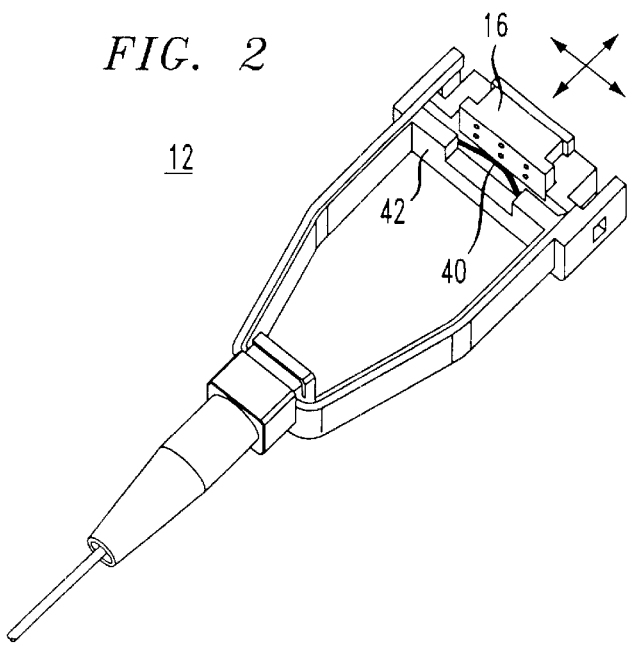
FIG. 2 is a simplified view of one of the connector halves as shown in FIG. 1.

An exemplary connector arrangement 10 formed in accordance with the present invention is illustrated in FIG. 1. The lid portions of each connector half are removed from this view to enable the various piece parts to be readily seen. Connector arrangement 10 is formed of separate connector halves 12 and 14 that are joined together to form the final connector assembly. Within each connector half is a fiber array connector piece that is used to support a fiber array itself, each connector piece including alignment features to enable the connector halves to self-align when mated. In the particular embodiment shown in FIG. 1, connector half 12 includes a fiber array connector 16 (partially hidden in this view) and connector half 14 includes a fiber array connector 18. Fiber array connector 18 is held in a fixed, stable position within connector half 14 by a support member 20, as shown. As will be described in detail below, fiber array connector 18 comprises a stack of substrates that have been processed to include a plurality of openings 22, each opening for supporting a separate optical fiber. An array of six optical fibers 24 is illustrated as being supported within fiber array connector 18. A similar array of six optical fibers 26 is disposed through a connector aperture 28 in connector half 12 and inserted into apertures 30 formed in fiber array connector 16. Locking arms 32 and 34 on connector halves 12 and 14, respectively, will mate when the connector halves are joined to provide physical connection between the fiber array connectors. A similar pair of locking arms 36 and 38 are disposed on the opposite site of connector halves 12 and 14. In accordance with this particular housing structure of the present invention, a spring member 40 is disposed between fiber array connector 16 and a connector support member 42 so as to allow for fiber array connector 16 to "float" within support member 42 until contact is made with fiber array connector 18 and their respective alignment fiducials mate to form the final alignment between the fiber arrays. FIG. 2 contains a simplified view of connector half 12 (with fiber array 26 removed), clearly illustrating the location of spring member 40 with respect to fiber connector array 16 and support member 42.

Figure 3:
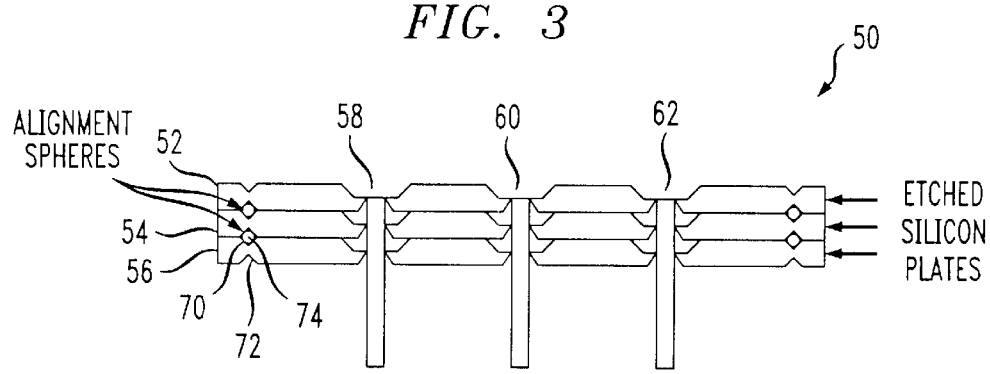
FIG. 3 contains a cut-away side view of an exemplary N×M fiber array connector formed in accordance with the present invention.

A cut-away side view of an exemplary fiber array connector 50 is shown in FIG. 3, where fiber array connector 50 can be used as fiber array connectors 16, 18 in the arrangement as shown in FIG. 1. Connector 50, as shown, comprises three separate substrate members 52, 54 and 56, stacked to form apertures 58, 60 and 62 for fibers 64, 66 and 68, respectively. In a preferred embodiment, substrate members 52, 54 and 56 comprise silicon substrates which are etched to form vias (through-holes) that are aligned from one substrate to another to form apertures 58, 60 and 62. Alignment detents such as detents 70 and 72 depicted on substrate 56, are formed on the top and bottom major surfaces of each substrate member, so that a spherical member (such as sphere 74) may be inserted between adjacent detents when the substrates are stacked together to provide physical integrity to the array connector.

Figure 4:
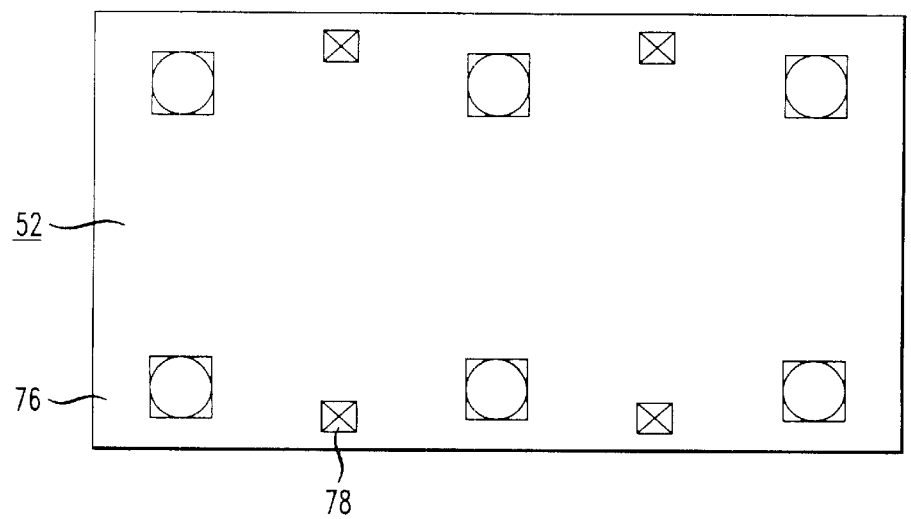
FIG. 4 is a top view of the fiber array of FIG. 3, illustrating an exemplary set of alignment fiducials as formed in the top substrate member of the connector.

A top view of substrate 52 of fiber array connector 50 is shown in FIG. 4. In accordance with the present invention, top surface 76 of substrate 52 is further processed to include a plurality of alignment fiducials 78, disposed at predetermined locations removed from the fiber aperture locations. In the formation of the connector arrangement of the present invention, another fiber array connector will be formed to include similarly disposed alignment fiducials so that as the two array connectors are joined, spherical elements are inserted between mating alignment fiducials to facilitate the "self-alignment" of the fiber arrays.

Figure 5:
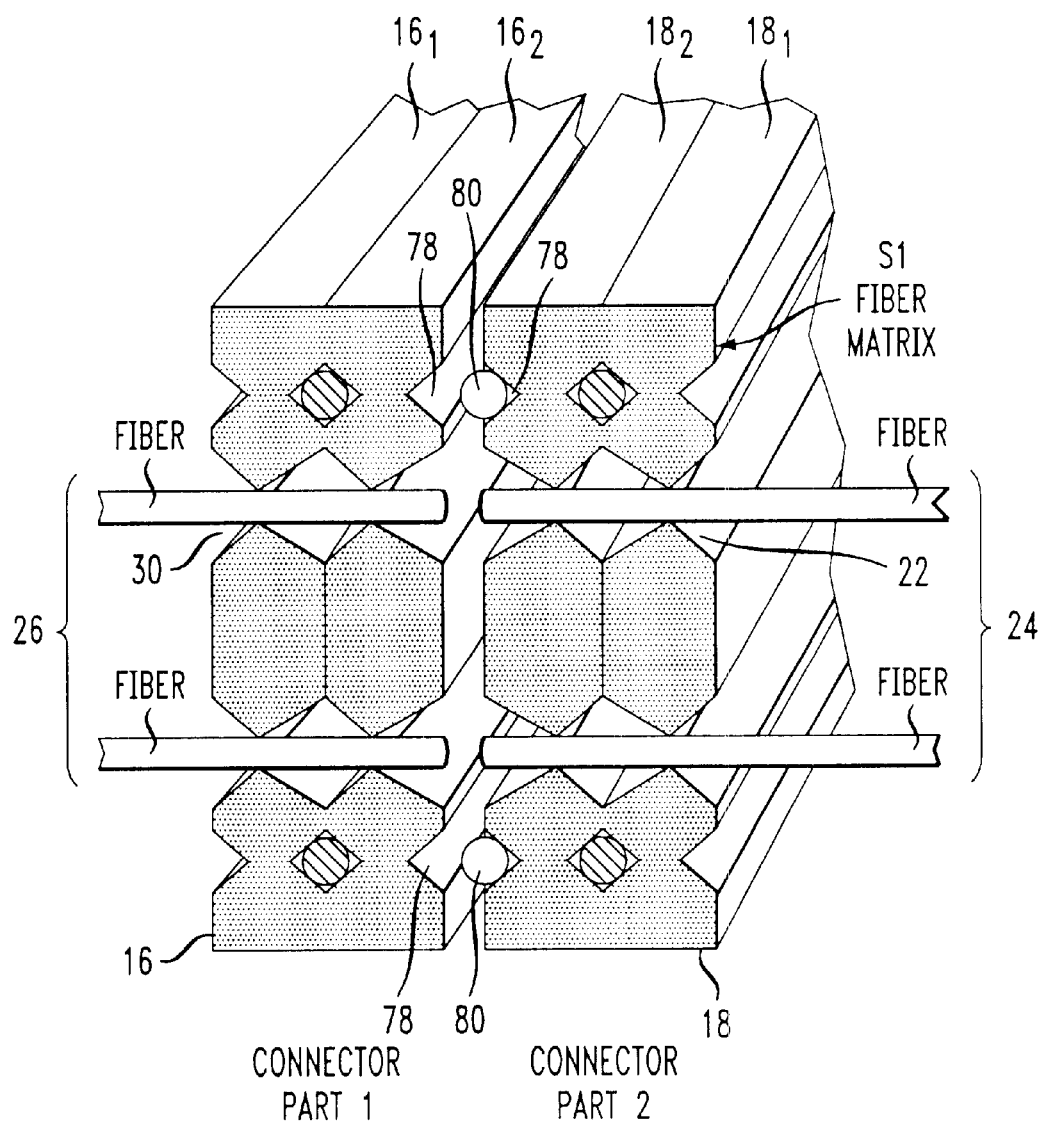
FIG. 5 is an isometric view of a pair of fiber array connectors as they are joined to form the connector arrangement of the present invention.

An isometric, simplified, view of fiber array connectors 16 and 18 as they are being joined is shown in FIG. 5. In this exemplary embodiment, array connector 16 includes a pair of substrates, denoted $16_1$ and $16_2$ and array connector 18 includes a similar pair of substrates, denoted $18_1$ and $18_2$. Fiber array 26 is shown as disposed through apertures 30 formed in array connector 16 and fiber array 24 is shown as disposed through apertures 22 in array connector 18. In accordance with the present invention, passive self-alignment between array connectors 16 and 18 is achieved by using alignment fiducials 78, where these fiducials are formed as shown on the top surfaces of substrates $16_2$ and $18_2$. Spherical members 80 are disposed between contiguous fiducials 78 and function to both align the connector halves and provide a physical connection between array connectors. In one embodiment, spheres 80 may be permanently attached to, for example, fiber array connector 18 and then brought into contact with fiducials 78 on fiber array connector 16 when the connector halves are joined.

Figure 6:
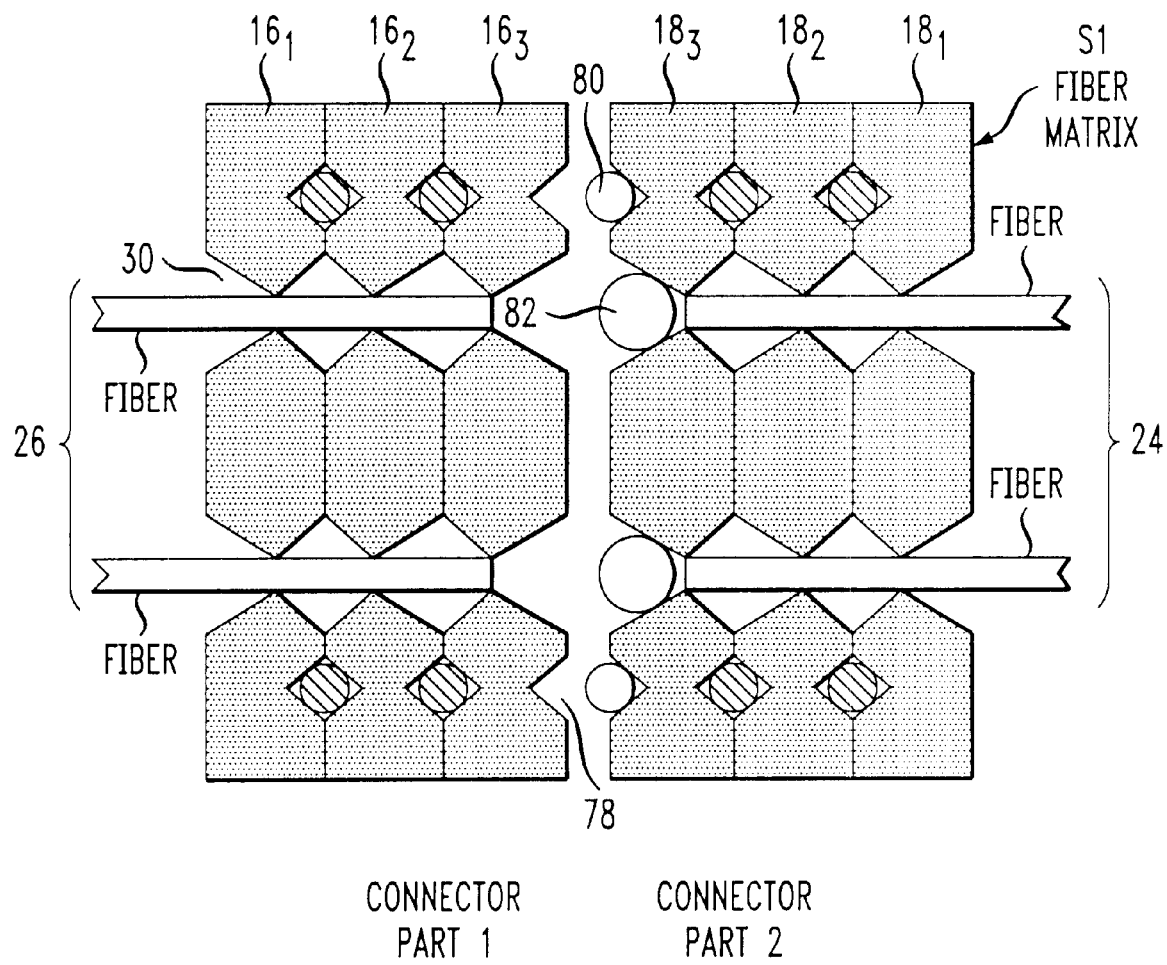
FIG. 6 contains a cut-away side view of a pair of fiber array connectors of the present invention, including an array of coupling lenses disposed between the fiber array connectors.

As mentioned above, the connector arrangement of the present invention may be formed to including spherical coupling lenses disposed between communicating fibers in the mated array structure. FIG. 6 contains a cut away side view of an exemplary embodiment including a plurality of spherical lenses 82 disposed in alignment with, for example, fiber array 24 of fiber array connector 18. In the particular embodiment illustrated in FIG. 6, each fiber array connector comprises a stack of three separate substrates, denoted $16_1$, $16_2$, $16_3$ and $18_1$, $18_2$, $18_3$, respectively. As with the other arrangement discussed above, the substrates may comprise silicon substrates that are etched to generate the through-holes that form the apertures. Alternatively, a silicon "master" substrate may be formed, with plastic array substrates then formed using a process such as transfer molding or injection molding from the silicon "master" (or the "negative" of the master, as the case may be). In any event, the utilization of lenses 82 may improve the coupling efficiency between fiber arrays 22 and 26 in the connector of the present invention.

Figure 7:
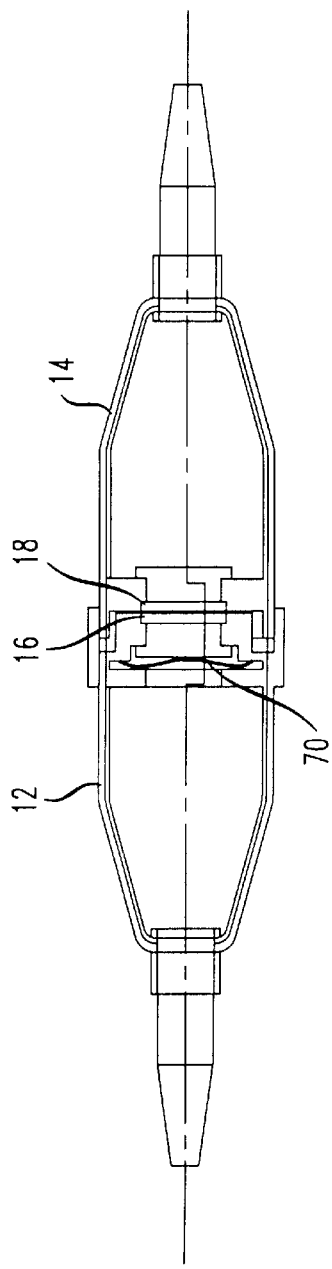
FIG. 7 is a top view of a connector arrangement of the present invention, including the connector housing, with the fiber array connectors joined together.
Figure 8:
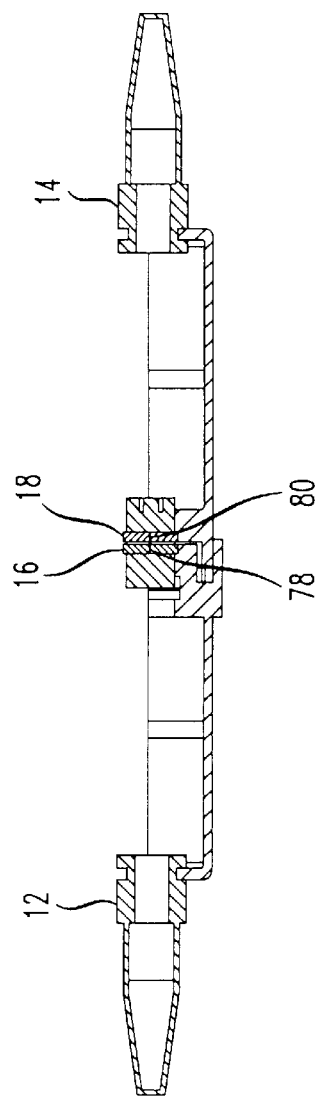
FIG. 8 is a side view of the connector arrangement of FIG. 7.

FIG. 7 shows a cut-away top view of connector arrangement 10, with fiber array connectors 16 and 18 mated in the manner discussed above in association with FIG. 5; that is, self-aligned so that the array of fibers (not shown) associated with fiber array connector 16 will align with the array of fibers (not shown) associated with fiber array connector 18. Clearly evident in this view is spring member 70, used to urge "floating" fiber array connector 16 into contact with fixed fiber array connector 18. A cut-away side view of connector arrangement 10 is shown in FIG. 8, where the self-aligned joining of fiber array connector 16 to fiber array connector 18 is clearly shown, with alignment fiducials 78 and spherical member 80 used to provide the self-aligned connection.

It is to be understood that the fiber array connector as discussed above may be sized to use with virtually any N×M dimensioned array of optical fibers. The 2×3 array as depicted in the drawings in considered to be exemplary only. Further, there are other housing arrangements that may be used with the fiber array connectors formed in accordance with the present invention, the housing as discussed above is considered to be exemplary only. Finally, the connector of the present invention may also include lensing elements

What is claimed is:

1. A self-aligned fiber array connector arrangement for coupling a first N×M array of optical fibers to a second N×M array of optical fibers, the connector arrangement comprising a first connector half including an aperture for introducing the first N×M array of optical fibers into the connector;

a first N×M fiber array connector including an N×M array of apertures for receiving said first N×M array of optical fibers; and a fixed support member for capturing and maintaining said first N×M fiber array connector in a fixed position with respect to the first connector half, wherein the first N×M fiber array connector comprises a plurality of stacked substrates, a top substrate including a first plurality of alignment fiducials, the plurality of stacked substrates formed to provide said N×M array of apertures through the thickness of the stack; and a second connector half including an aperture for introducing the second N×M array of optical fibers into the connector;

a second N×M fiber array connector including an N×M array of apertures for receiving the second N×M array of optical fibers; and a floating support member for capturing said second N×M fiber array connector, wherein the second array connector comprises a plurality of stacked substrates, a top substrate including a second plurality of alignment fiducials, the plurality of staked substrates formed to provide said N×M array of apertures through the thickness of the stack, the floating support member providing for movement of said second fiber array connector with respect to said first array member so as to allow for the first and second pluralities of alignment fiducials to move with respect to one another and align to form a self-aligned connector arrangement.

2. A self-aligned fiber array connector arrangement as defined in claim 1 wherein the floating support member comprises a fixed surface for supporting the bottom surface of the second fiber array connector and a spring member disposed in contact with a rear side surface of said second fiber array connector, said spring member for allowing movement of the second fiber array connector with respect to the first fiber array connector.

3. A self-aligned fiber array connector arrangement as defined in claim 1 wherein each plurality of stacked substrates comprises a plurality of silicon substrates.

4. A self-aligned fiber array connector arrangement as defined in claim 3 wherein each array of N×M apertures comprise etched openings formed through the thickness of each silicon substrate.

5. A self-aligned fiber array connector arrangement as defined in claim 1 wherein the first plurality of alignment fiducials comprises a plurality of pyramidal detents formed in the top surface of the stacked substrates.

6. A self-aligned fiber array connector arrangement as defined in claim 1 wherein the second plurality of alignment fiducials comprises a plurality of pyramidal detents formed in the top surface of the stacked substrates.

7. A self-aligned fiber array connector arrangement as defined in claim 1 wherein
the first plurality of alignment fiducials comprises a first plurality of pyramidal detents, formed in the top major surface of the first plurality of stacked substrates; and
the second plurality of alignment fiducials comprises a second plurality of stacked substrates and disposed so as to align with said first plurality of pyramidal detents, with a plurality of alignment spheres disposed between associated pyramidal detents of the first and second pluralities of pyramidal detents, said plurality of alignment spheres for providing alignment therebetween, and mechanical attachment of, the first fiber array connector to the second fiber array connector.

8. A self-aligned fiber array connector arrangement as defined in claim 1 wherein the connector further comprises a plurality of spherical lenses disposed in each top surface aperture between the first fiber array connector and the second fiber array connector.

9. A self-aligned fiber array connector arrangement as defined in claim 1 wherein each substrate within each stack comprises a plurality of alignment fiducials formed on both a top major surface and a bottom major surface, said plurality of alignment fiducials for mating upon positioning of a plurality of substrates to form a stack of aligned substrates, wherein alignment is used to form apertures for support of an associated fiber array.

10. A self-aligned fiber array connector arrangement as defined in claim 9 wherein the plurality of alignment fiducials comprises a plurality of pyramidal detents, with spherical members disposed between adjacent pyramidal detents to provide alignment of and physical attachment between the plurality of substrates used to form a stack of substrates.

* * * * *